Nov. 30, 1965 R. E. ARSENEAU 3,221,106

SPEECH PATH CONTROLLER

Filed March 22, 1962 5 Sheets-Sheet 1

INVENTOR.
R.E. ARSENEAU
BY J. Warren Whitesel
ATTORNEY

Nov. 30, 1965 R. E. ARSENEAU 3,221,106

SPEECH PATH CONTROLLER

Filed March 22, 1962 5 Sheets-Sheet 2

Nov. 30, 1965    R. E. ARSENEAU    3,221,106

SPEECH PATH CONTROLLER

Filed March 22, 1962    5 Sheets-Sheet 5

3,221,106
SPEECH PATH CONTROLLER

Roger E. Arseneau, Chicago, Ill., assignor to International Telephone and Telegraph Corporation, New York, N.Y., a corporation of Maryland Filed Mar. 22, 1962, Ser. No. 181,745
30 Claims. (Cl. 179—18)

This invention relates to electronic switching telephone systems and more particularly to speech path controllers for such systems. Although the invention may be used in many different systems, reference is here made to a co-pending application which shows an exemplary telephone system in which the invention is particularly useful. That co-pending application, entitled "Electronic Switching Telephone System," is identified by Serial No. 181,626, filed Mar. 22, 1962, by R. E. Arseneau, J. Bereznak, P. E. Osborn, and assigned to the assignee of this invention.

A recently developed electronic switching network includes electronic crosspoints having the ability to complete self-seeking paths through the network without requiring expensive control circuits in the networks. Instead of such control circuits, external logic circuits provide end-marked points at the periphery of the network. Responsive thereto, the paths find their own way from a first marked point through the network to a second marked point.

The end-marking logic circuits must provide certain functions that are necessary to complete a telephone call. The usual call functions include the following: (1) recognize on-hook and off-hook conditions controlled by telephone hookswitches, (2) find calling lines, (3) return dial tone, (4) receive dial or switch control signals, (5) select a called line, (6) connect and ring a called telephone, (7) establish a connection when a called party answers, and (8) release a connection upon completion of a call.

In addition, the logic circuits should provide all other functions required by any unique characteristics of the self-seeking network. Among these unique characteristics are the following: (1) talking battery should be very quiet to avoid self-release of a switch path, (2) potentials should be applied to and removed from the network in a manner which prevents transients that could cause false firings, (3) all signals should be sent in a manner which does not cause crosstalk, and (4) connections should not be completed to busy points. Finally, the logic circuit should provide all functions required to accommodate particular network components. Chief among these components is a PNPN diode having a rate effect firing characteristic. To accommodate this rate effect characteristic, the end-marking potentials should be applied with a slow rising wave form, for reasons explained in a co-pending application entitled, "Electronic Switching Matrix," Serial No. 145,220, filed October 16, 1961, by J. Bereznak, and assigned to the assignee of this invention.

Accordingly, an object of this invention is to provide a speech path controller for electronic switching telephone systems. A more specific object is to provide a speech path controller for end-marked, self-seeking, switching networks. In particular an object is to provide a controller for a PNPN diode matrix.

Another object is to provide logic circuits for controlling self-seeking networks especially—although not exclusively—useful in telephone switching systems. Here, an object is to provide control circuits at the periphery of switching networks. In this connection, an object is to accomplish all required or desirable functions at such periphery. Conversely, an object is to avoid the need for controls in the network itself.

In carrying out the invention in one form, a speech path controller comprises a line circuit and a link circuit connected to opposite sides or ends of a self-seeking switching network. First, the link applies an end-marking voltage having a slow rising wave form of one polarity to one side of the network. Then a line circuit applies an end-marking voltage having a slow rising wave form of opposite polarity to the other side of the network. Thereupon, a self-seeking path fires from one end-marking to the other end-marking with a current controlled, random selection of crosspoints. In the line circuit, a source of instant current provides holding current as the path is fired through the network.

In accordance with other aspects of the invention, the line and link circuits provide the many logic functions that are necessary to complete a telephone call. One of these functions involves a hookswitch controlled circuit for sending a ringing signal to a telephone line. This circuit includes a diode poled to pass the ringing current. When a called party answers, the hookswitch closes a circuit to back-bias the diode and block transmission of the ringing current. Another function involves a busy-idle test circuit located in a subscriber line circuit. Here, a seize signal of relatively low potential operates the line circuit, but only if idle, to extend a connection through an exchange. A seize signal of relatively high potential operates the line circuit to extend a call through an exchange without regard as to whether or not the associated line is busy.

The above mentioned and other features and objects of this invention and the manner of obtaining them will become more apparent, and the invention itself will be best understood by reference to the following description of an embodiment of the invention taken in conjunction with the accompanying drawings, in which.

Figure 10:
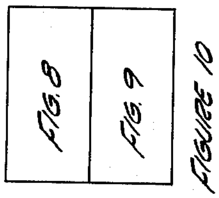
Figure 3:
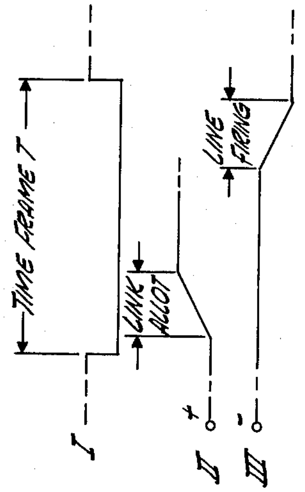
FIG. 3 shows voltage wave forms which help explain the operation of the circuit of FIG. 2.
Figure 8:
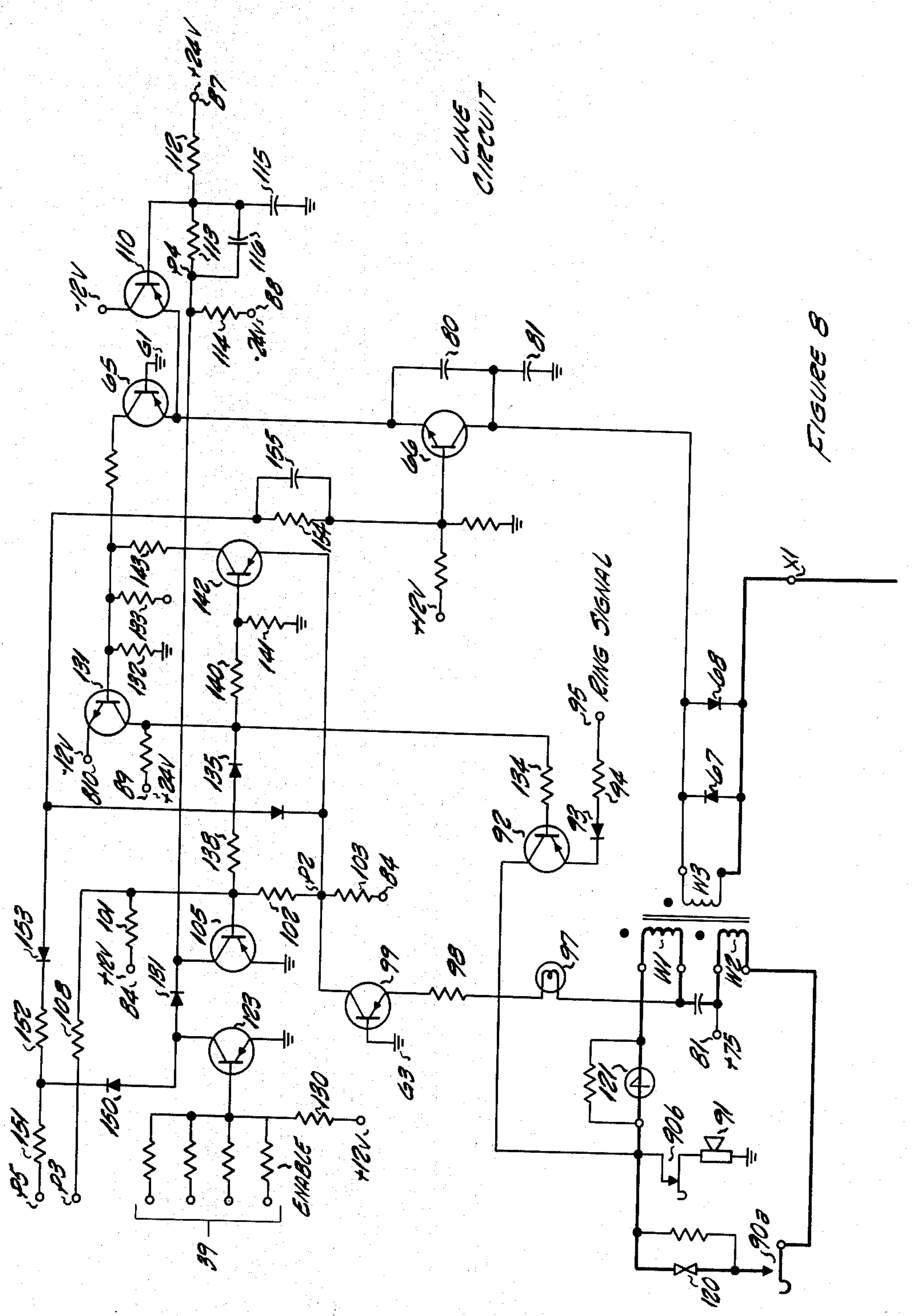
Figure 9:
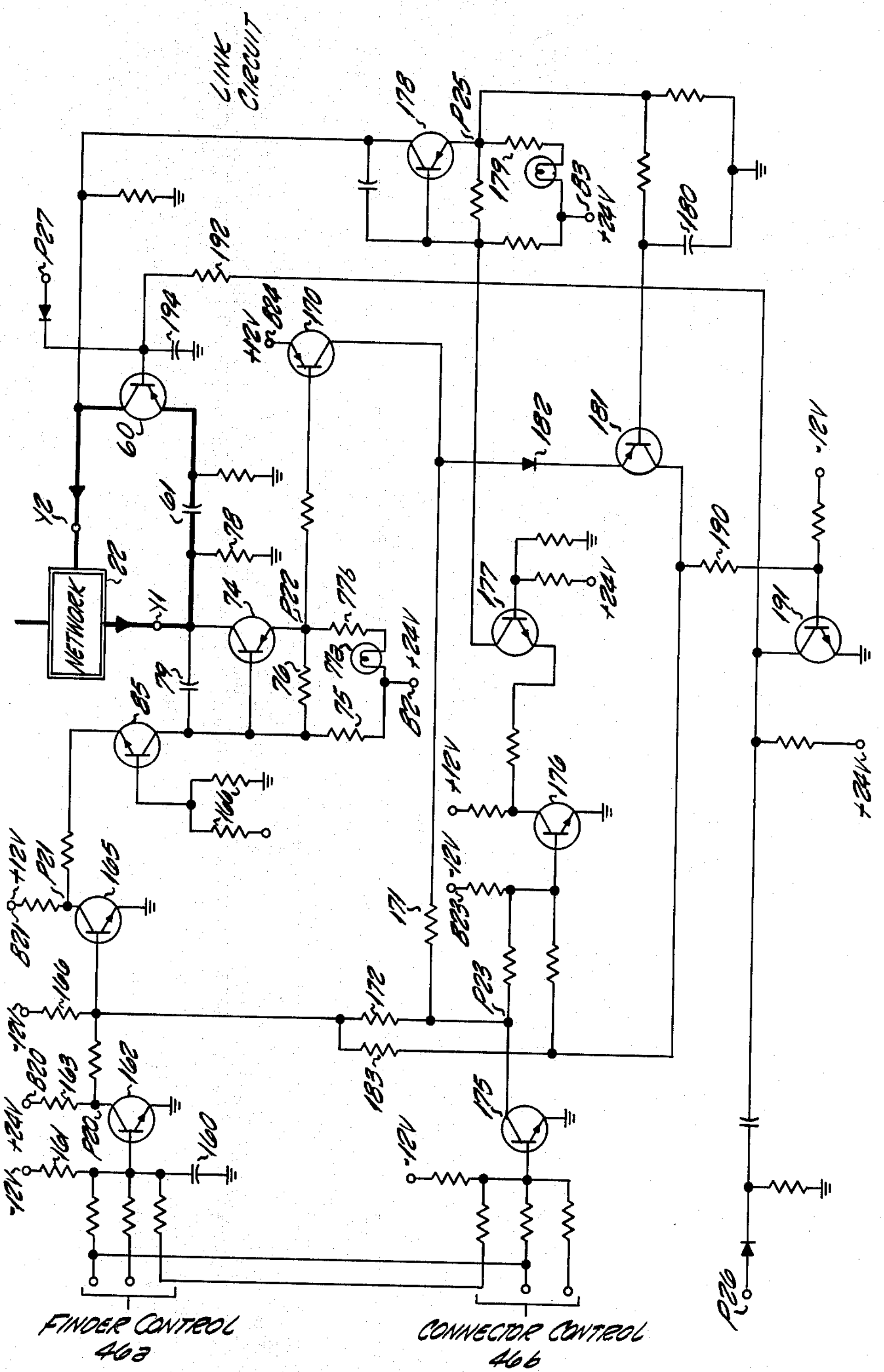

FIGS. 8 and 9 show the complete schematic circuit from which FIGS. 2, 4, 5 and 7 are taken; and FIG. 10 shows how FIGS. 8 and 9 are joined to provide a complete and understandable circuit.

*General description*

Figure 1:
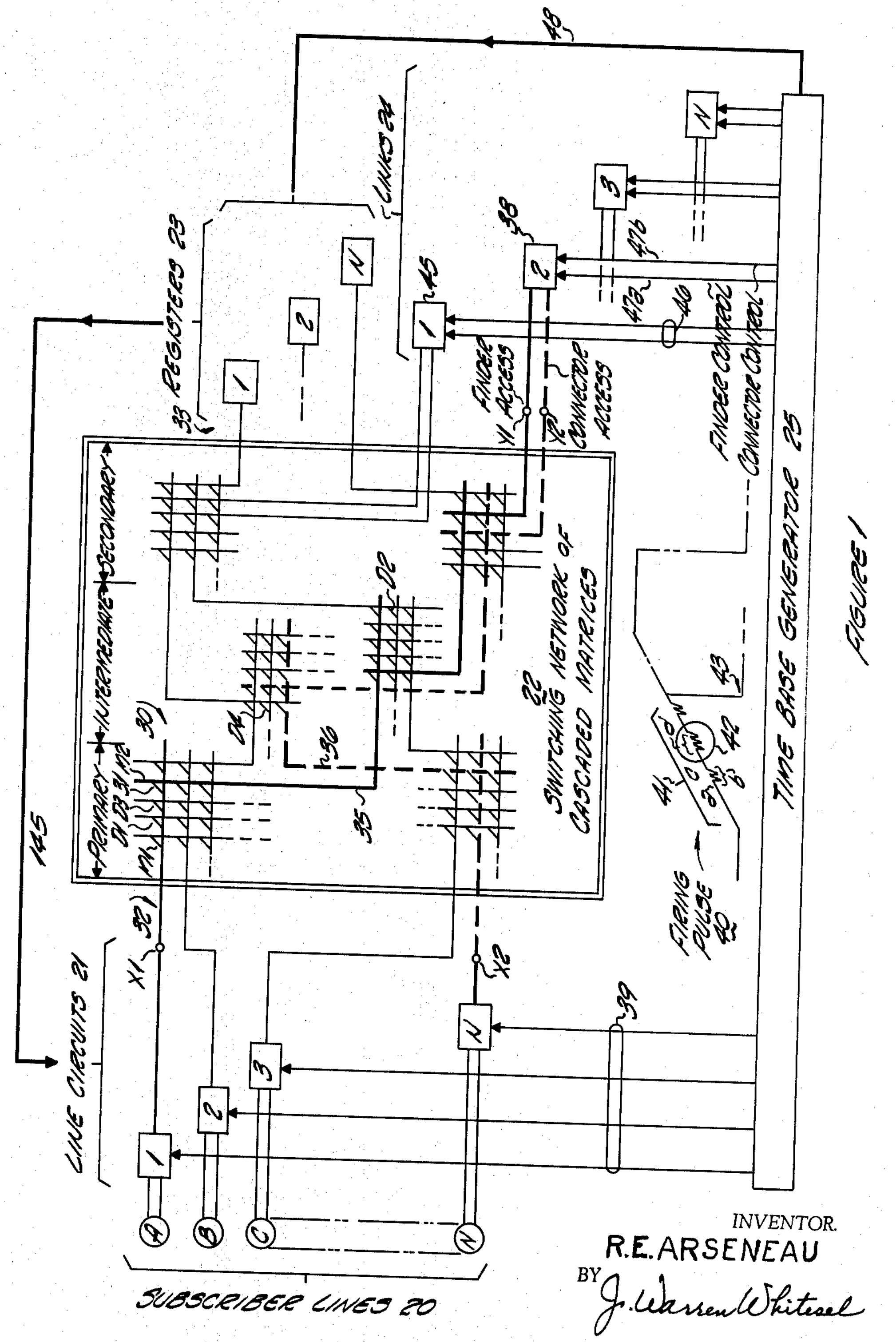
FIG. 1 is a block diagram showing an exemplary telephone system using the invention.

FIG. 1 shows a simplified block diagram of an exemplary electronic switching telephone system utilizing the invention. The principal divisions of the system are subscriber lines 20, line circuits 21, a self-seeking, current controlled switching network 22, registers 23, switch path controlling links 24, and a time base generator 25. Generator 25 controls the sequence of events necessary to establish a call.

All of these blocks are explained in detail in the above-identified Arseneau-Bereznak-Osborn application. Briefly, the switching network 22 is here shown as having a plurality of cascaded matrices. Each matrix (one of which is shown at 30) is a self-seeking device including a combination of spaced-apart switching elements (one of which is shown at 31), for extending connections from the line side 32 to the link side 33 of the network. The matrix includes first and second (or horizontal and vertical) multiples, two of which are shown at M1, M2. These multiples (which may be conductors or busses) are arranged to provide a number of crosspoints, each of which includes an electronic switch 31 (such as a PNPN diode) for electrically connecting the intersecting multiples when the diode is switched "on" and electrically isolating the intersecting multiples when the diode is switched "off."

As those familiar with a PNPN diode know, it switches "on" or fires when a voltage in excess of a firing potential is applied across its terminals. Thereafter, current exceeding a "holding" level must flow through it to hold it "on." If this current flow terminates, or falls below the "holding level," the diode switches "off." After one diode switches "off," another parallel connected diode switches "on," assuming that the firing potential remains. In this way, the diodes switch "on" and "off" in a random manner until a self-seeking path finds its way through the network and a holding current flows.

If for example, end-marking potentials are applied at points X1, Y1 a self-seeking path may race through the matrix over the connections 35 represented by heavily inked solid lines. In like manner, if end marking potentials are applied at points X2, Y2, another self-seeking path may extend over the connection 36 represented by heavily inked dashed lines. If the path 35 represents a connection between a calling line A and control equipment (link 38) and the path 36 represents a connection between a called line N and the same control equipment 38, it is only necessary for the control equipment to join the point Y1, Y2 to complete a speech path from calling line A to called line N. This is the speech path which is controlled in accordance with this invention.

The subscriber lines 20 are connected to the line side 32 of the switching network 22 by way of individually associated line circuits (as shown at 21). Each line circuit is individually identified by time frame pulses applied to control conductors 39 from time base generator 25. The line circuits provide a first electrical indication when a subscriber line goes off-hook to seize a link and thereafter provides a second electrical indication to give a busy marking. When the line originally goes off-hook, the electrical indication preferably is a firing pulse with a wave form shown at 40. This pulse is a voltage having a slow rising ramp front 41, which causes self-seeking, current controlled, paths to extend through the network in search of an end-marking. During this search, the PNPN diodes switch "on" and "off" in a random manner, as shown by the voltage variations at 42. When a path is completed and the resistance between points X1, Y1 drops, the firing pulse effectively terminates as shown at point 43. All of this is explained in the above identified Bereznak application.

When a calling subscriber initiates a call, a path fires from the calling line through the network 22 to a register 23 under control of the time base generator 25. Each of the registers 23 includes means for storing an identification of both calling and called subscriber line numbers. Thereafter, the register may cause each idle link in group 24 to try, in turn, to complete a connection through network 22. This way, no one link is committed to any given call until after it is known that that particular link can complete the call. Here, if all links are idle, it may be assumed that the line 45 tried and failed to complete a connection during a time period while the generator 25 marked conductors 46.

Each link includes means for end marking access points to the network 22 and for providing an audio path when a call is completed through the network. After a path is so completed, the link commands the register to release. In greater detail, the lines are identified via conductors 39 by time frames of "T" duration. The duration of each link time frame marked via conductors such as 46, 47 is (2T) or twice the duration of each line time frame, and the duration of each register time frame applied via conductors 48 is equal to the sum of the duration of all line time frames. That is, if there are "N" lines, the duration of a register time frame is "NT." As we shall learn, the link tires to find or fire to a calling line during the first (or "finder") half (T) of its (2T) time frame and to connect or fire to the called line during the second (or "connector") half (T) of its (2T) time frame. If successful, the register is released, and a "switch through" gate in the link interconnects the lines. If unsuccessful, the next link tries. Therefore, the interaction of these time frame controls over the switching network allows the completion of a call in an orderly manner.

*Features description*

In the following "detailed description," all of the speech path controller circuit is described in great detail. Now, however, some of the more important aspects of the controller are explained briefly. To facilitate this explanation, certain fragmentary portions of FIGS. 8 and 9 and associated graphical material are shown separately in FIGS. 2–7. To assist the reader, the same reference numerals identify the same parts in all figures.

Figure 2:
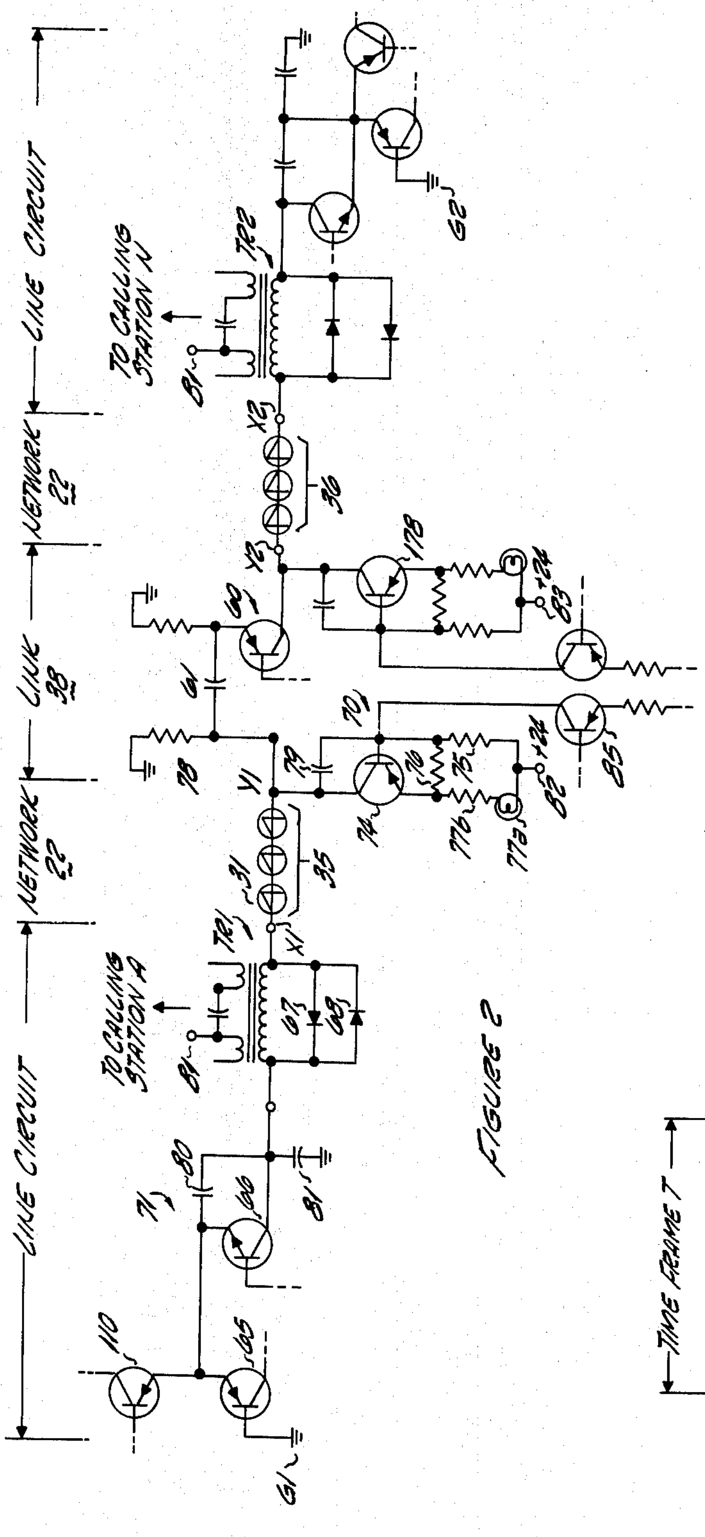
FIG. 2 is a fragmentary schematic circuit diagram showing the speech path through FIG. 1.

*Speech path.*—The speech path, per se, is shown in FIG. 2. To coordinate FIGS. 1 and 2, it is assumed that the calling line connects to station A and the called line connects to station N. The speech path 35 connects the calling line A to link 38, and the speech path 36 connects the called line N to link 38. A switch through gate circuit 60 switches "on" to interconnect the two lines after the two speech paths 35, 36 are completed. Thereafter, the speech path (for voice frequencies) is traced from the calling line station A through line transformer TR1, a speech path 35 which includes three PNPN diodes 35 (one of which is shown at 31) of the network 22, a coupling capacitor 61, the switch through gate 60, three PNPN diodes 36, and transformer TR2 to the called line and station N.

One terminal of the D.C. talking battery from the subscriber lines is designated B1. However, the potential of the D.C. battery cannot pass across the line transformers TR1, TR2. Instead, the D.C. potential for the calling line speech path is applied via the circuit traced from ground G1, through a pair of saturated transistors 65, 66, a secondary winding of transformer TR1, the PNPN diodes 35, transistor 74 and a resistor 77 to a +24 volt talking battery B2. A similar path for the called line may be traced from battery B3 to ground G2. The diodes 67 and 68 block transients which might otherwise switch "off" the diodes 35.

As explained in the above-identified Bereznak application, the switch path 35 is self-seeking; i.e., it finds its own course between two end-marked points without requiring controls in the network. It depends upon an absence of current flow over a partially established but incompleted path to cause that path to collapse. It depends upon the presence of current flow to hold a completed path. Thus, the switch path may be completed under the control of equipment (1) located at the periphery of the network (i.e., in line and link circuits), and (2) adapted to apply the end-markings, and to provide the required current flow.

Means are provided for applying end-marking potentials to the switching network. Since a PNPN diode has characteristics which are best served when these potentials have a slow rising wave form, they should provide the timing illustrated in FIG. 3. One time frame T from the time base generator 25 is illustrated by wave form I.

During a first or LINK ALLOT portion of this time frame, the circuit 70 applies a slow rising, positive going pulse (curve II) to point Y1. This allots the link 38 to find a calling line. During a second or LINE FIRING portion of a time frame, the circuit 71 applies a slow rising, negative going pulse (curve III) to the point X1. This fires a path between the points X1, Y1. In like manner, the path fires between points Y2 and X2 during the next adjacent time frame T of the 2T time frame that identifies link 38.

The circuit 70 includes a transistor 74, here shown as a PNP junction type device. The transistor 74 is provided with a biasing network 75, 76, and 77; a load 78; and an output wave shaping circuit (capacitor 79). The resistor 77 includes in series, a resistance 77*b* and a lamp 77*a*. When the transistor 74 is switched "off," a small leakage current flows from ground through load resistor 78, the collector-base junction of transistor 74, resistors 76 and 77 to +24 volt talking battery B2. The resistor 76 must be small enough to allow this leakage current to flow without building up an IR drop across the resistor 76 which will make the emitter positive relative to the base and thus cause the transistor 74 to switch "on." When the transistor 74 is "on," the resistor 76 must be large, relative to the emitter to base junction resistance. Otherwise, current will divide between the base-emitter junction and resistance 76. This division of current would increase the power requirements on battery B2.

The shape of wave form III results from the rate at which the emitter follower transistor 110 turns "on" as it is slowly driven into saturation. The potential at point X1 slowly goes to a negative potential with the ramp front wave form of curve III.

Means are provided for instantly furnishing a holding current as the path is fired through the network. In greater detail, before a path fires through the network, a large charge bulids on capacitor 81. The small pulses shown at 42 in FIG. 1 are bypassed through capacitor 80. In like manner, the transistor 74 has no appreciable load. Thus, it saturates and causes its collector to go to a potential close to that of battery B2. The capacitor 79 provides a current path while the current through transistor 74 is changing. This in turn causes the desired ramp front positive going wave shape of curve II.

Instantaneously, upon completion of the path through the network 22, the capacitor 81 discharges through the path to provide an instantaneous load current for the transistor 74. The transistor 74 is no longer saturated, but becomes a constant current source. It draws base current and saturates the driver transistor 85.

*Control of storage time.*—A very important feature of the speech path controller is its ability to control the charge carrier storage time of the electronic switches in the network. To understand this feature, it may be helpful to briefly review the disclosure of FIG. 1.

Each subscriber line connects to a horizontal multiple in a primary matrix (such as multiple M1). If all intersecting vertical multiples are idle, theoretically self-seeking paths may search through every diode connected to that horizontal multiple before a path finds its way through the network. In a similar theoretical way, every idle, connected intermediate matrix diode may also fire during a given search. When more than one primary matrix diode fires, the storage time of minority carriers in the electronic switches of the network may cause trouble if no corrective devices are provided.

In greater detail, the firing pulse wave form 40 of FIG. 1 arbitrarily shows that three primary matrix diodes fire before a path is completed through the network. Assume that this wave form is a plot of the voltage at point X1. The voltage raises to a point *a* where the primary matrix diode (D1 for example) with the lowest breakdown voltage characteristics fires. Then, a number of intermediate matrix diodes (such as D2 for example) fire, as shown at *b*. As each diode fires, a capacitance charge is stored in the switch path. These charges may be stored in minority charge carrier storage or in capacitors connected to the switch path, as described in the above-identified Bereznak application.

It is here assumed that no path is completed through diode D1, so it switches "off" and the voltage at point X1 continues to rise to point *c*. Then, the primary matrix diode (D3 for example) having the next to the lowest breakdown voltage characteristic fires. Next, diodes (such as D4 for example) in the intermediate matrix fire, as indicated at *d*.

The firing pulse 40 and foregoing description have greatly exaggerated the firing voltages and timing to facilitate an explanation of the switching. In reality, the matrix diodes switch "on'" and "off" extremely fast. Thus, the diode D2 might switch "on" after any one or more of the other diodes have started to switch "off," but before the stored charge carriers have adequately decayed. In a similar manner, intermediate matrix diodes may switch "on" or "off" to cause similar effects while the primary matrix diode that supplies the holding current stays "on."

Figure 2A:
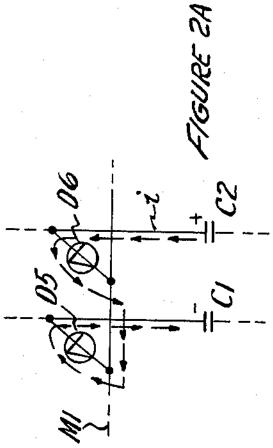
FIG. 2A is a portion of a PNPN diode matrix which helps explain one feature of the speech path controller of FIG. 2.

Consider FIG. 2A which is a fragment of one horizontal multiple M1 of the primary matrix 30 in FIG. 1. Assume that diode D5 fires to charge capacitor C1 with a negative charge, as shown. If a path is not completed through diode D5, it starves and switches "off." When another primary matrix diode D6 first switches "on," its capacitor C2 is charged positively, as shown. At this instant, before capacitor C2 can charge through diode D6, the capacitor C1 tries to discharge through diodes D5, D6 over the path marked by arrow *i*. This is one discharge which causes trouble.

The instant that the switch path is completed to the link, current surges through the fired diodes to the link. At this point another discharge may occur which, if not corrected, may cause trouble.

In any event, if the stored charges discharge through a fired diode they are back biased and may turn "off." The back biased diode will not turn "off," however, if its charge carrier storage time last longer than the back biasing discharge time. Thus, the storage time in the diode must be longer than the back bias time. This storage time increases with current through the diode. This means that the current through the diode must be relatively high during the time period while the back biasing discharges may occur. It so happens that this relatively high current will not harm the diodes, but if the high current continues too long, it requires unnecessary power dissipation.

In carrying out this invention, a non-linear, with respect to time, resistance is used to allow a surge of the relatively high current which will increase charge carrier storage time during switching. After switching, the resistance will limit current to safe levels for indefinite operating times. The non-linear resistance is lamp 77*a* connected in series with resistor 77*b* (FIG. 2). The lamp is any suitable device having a thermal inertia characteristic which matches the matrix needs. In one exemplary system, a GE 327 type lamp was used. When the transistor 74 switches "on," the lamp filament is cold and offers little or no resistance. This allows a relatively great current flow through resistor 77*b*, transistor 74 and point Y1 to the network diodes. After a period of time measured by its thermal inertia charcteristics, the lamp filament becomes hot and its resistance limits the current to safe levels for extended operation. In the exemplary case, the reduced level current was approximately one-quarter to one-half of the relatively high level current.

Figure 4:
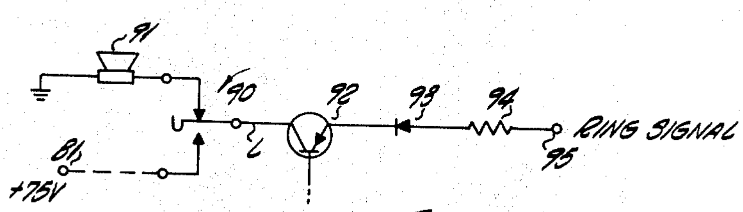
FIG. 4 is a fragmentary schematic circuit diagram showing how ringing current is applied to or removed from the line.

*Ringing current.*—Ringing current is applied to the line via the circuit shown in FIG. 4. The principal components of this circuit are: a hookswitch 90 for connecting either a sounder 91 (which may be a small loud speaker in the base of a telephone) or the +75 volt talking battery B1 to the line L; an electronic switch 92, here shown as a PNP junction device; a diode 93; a current limiting resistor 94; and a source of ringing signal 95. The switch 92 is turned "on" when a called line is seized. If the hookswitch 90 is normal, the current from the signaling source 95 flows through the circuit 94, 93, 92, 90, and 91 to ground. The sounder 91 reproduces the current as sound to summons a called party. If the hookswitch is operated, the sounder 91 is disconnected from the source 95. Instead, the potential of battery B1 back biases the diode 93 to block the flow of signal current to line L.

Figures 5, 7:
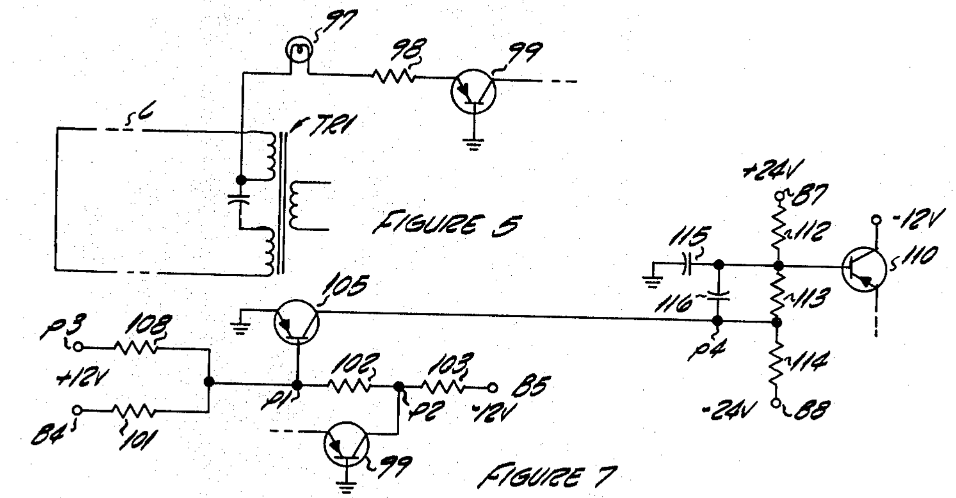
FIG. 5 is a fragmentary schematic circuit diagram showing how a non-linear resistance limits line current to accommodate lines having a great variety of resistances.
FIG. 7 is a fragmentary schematic circuit diagram showing a busy test and over-ride circuit.

*Line resistance control.*—Means are provided for maintaining a uniform line current within specified limits, despite non-uniformity of line resistances. More particularly, as shown in FIG. 5, this means includes a line L connected in series with the primary winding of the transformer TR1, a non-linear resistance 97, a current limiting resistor 98, and an electronic switch 99. The non-linear resistance may be a light bulb of the type commonly used as line lamps in telephone switchboards.

Figure 6:
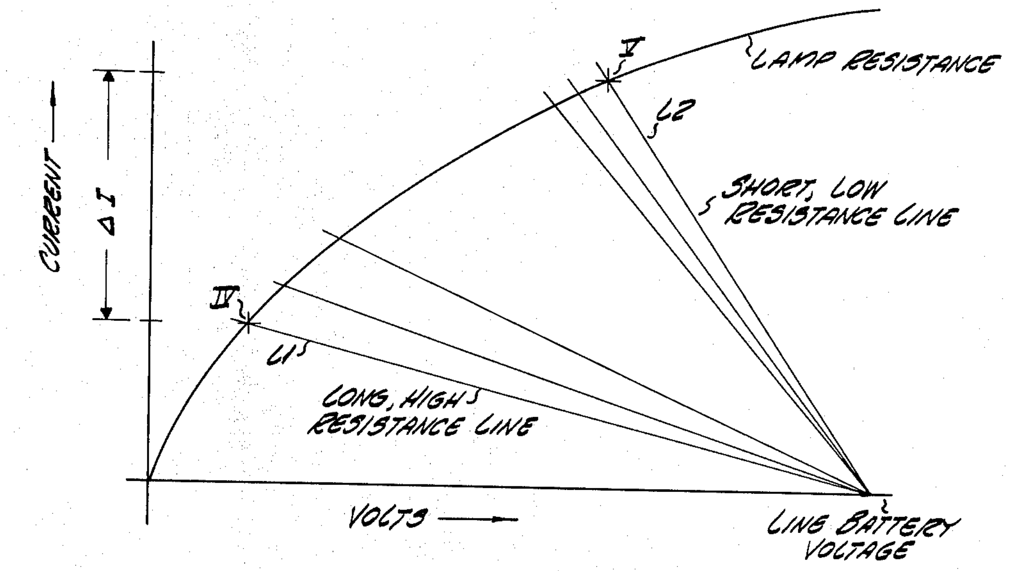
FIG. 6 is a plot of current on a vertical axis vs. volts on a horizontal axis which helps explain the response of the circuit shown in FIG. 5.

The voltage-current relation resulting from the resistance of the line L, per se, varies lineally with the length of the line, as shown in FIG. 6. The load line L1 of a long, high resistance telephone line has a low slope. The load line L2 of a short, low resistance telephone line has a steep slope. Thus, too large a current would flow over an unmodified short line and too small a current would flow over an unmodified long line. To avoid this, a non-linear resistance having characteristics shown by the "LAMP RESISTANCE" curve is connected in series with the line. When in series with a high resistance line, the lamp draws little current, and the total line current is that shown at point IV. When in series with a low resistance line, the lamp draws a large current, and the total line current is that shown at point V. Since the current variations falls between these two points, the transformer TR1 current variations are limited to that shown at $\Delta I$ and the transformer may be reduced in size. This feature is claimed in a co-pending application entitled, "LINE RESISTANCE COMPENSATOR," Serial No. 181,700 filed March 22, 1962, by R. E. Arseneau and John Bereznak, and assigned to the assigned of this invention.

*Busy testing.*—Busy testing is accomplished in the line circuit by a line seizure circuit as shown in FIG. 7. The principal components are a voltage divider 101, 102, 103 connected between a +12 volt battery B4 and a—12 volt battery B5. A first potential point P1 on the voltage divider is connected to the control electrode of an electronic switch 105 (here shown as a junction type PNP transistor). A second potential point P2 is connected to an output electrode of a second electronic switch 99 (also shown as a junction type PNP transistor). A fourth resistor 108 connects the point P1 to a "seize" point of access P3. Potentials which appear at point P3 cause a path to fire to a subscriber line. Hence, to prevent seizure of a busy line, it is only necessary to inhibit the effects of this potential.

The relative values are such that the transistor 105 is switched "on" when no seize signal appears at point P3 and no ground potential appears at point P2. When the transistor 99 is "on" and saturated, the point P2 goes to ground, and transistor 105 switches "off." If the point P3 is marked by a +12 volt battery and if point P2 is not marked by ground potential (transistor 99 is "off"), the transistor 105 switches "off." On the other hand, if point P2 is at ground potential, the transistor 105 is not switched "off" and there is no effect when +12 volts are applied to point P3; but, the transistor 105 does switch "off" if +24 volts are applied to point P3. Hence, ground at point P2 is a busy signal which is over-ridden by a +24 volt pulse at point P3.

A slow rising firing pulse is generated each time that the transistor 105 switches "off." The pulse forming circuit includes a transistor 110, biased "off" by a voltage divider including the resistors 112, 113, 114 connected between +24 volt battery B7 and a —24 volt battery B8.

When transistor 105 is "on," ground at point P4 switches the transistor 110 "off." When the transistor 105 switches "off," ground is removed from point P4. Then, current from battery B8 flows through resistor 114 and capacitors 116 and 115 to ground. As a charge accumulates on the capacitor 115, at a rate fixed by resistor 114, the base of transistor 110 slowly goes negative with respect to its emitter. As the transistor 110 turns "on" a slow rising negative-going firing pulse is generated.

From the foregoing, it is seen that the circuit of FIG. 7 provides a busy indicating means. An off-hook calling subscribed switches "on" the transistor 99 to switch "off" the transistor 105 and generate a firing pulse. If the subscriber station remains "off hook, a +12 volt seize pulse at point P3 cannot switch the transistor 105 off" a second time. Thus, a +12 volt seize pulse to a busy line circuit will not generate a firing pulse. But, a +24 volt pulse at point P3 will switch "off" the transistor 105 to generate a firing pulse, thus over-riding the busy condition.

*Detailed description*

Next, reference is made to FIGS. 8, 9 where the fragmentary circuits explained above are tied into a complete speech path control circuit. The operation of the speech path controller may be explained best by a description of how a call is completed from a calling line through the network to a called line.

*Calling line.*—To initiate a call, a subscriber lifts a handset to close hookswitch contacts 90*a*, thus completing a loop traced from +75 volt battery B1 through winding W2, contacts 90*a*, dial 120, PNPN diode 121 (which fires), winding W1, lamp 97, resistor 98, the emitter-collector of transistor 99 and resistor 103 to a —12 volt battery B4. The transistor 99 saturates so that the emitter-collector potential drops to the base ground voltage G3.

Previously, the transistor 105 was "on." Now, however, the ground on the base-collector junction of transistor 99 is applied to the point P2. Thus, transistor 105 switches "off." There is no immediate effect because transistor 123 is held "on" by negative battery applied through one or more of the NOR gate inputs 39. When the time frame of the calling line occurs and after a register or link is allotted, the negative potential is removed from each input of NOR gate inputs 39. Then, the +12 volt battery applied through resistor 130 makes the base of transistor 123 positive. Responsive thereto, the transistor 123 switches "off" to remove its emitter ground, previously applied through diode 131 to the upper end (point P4) of resistor 114. Thus, the ground potential is removed from the upper end of resistor 114 only when both transistors 105 and 123 are "off." This means that a path can fire from a calling line through the network to a register or a link only when a line is off-hook during its line identifying time frame.

While ground is applied to the upper end of resistor 114, the base of transistor 110 is made positive.

A firing pulse having a slow rising, negative-going, ramp front is generated when the ground potential is removed from the upper end of resistor 114. In greater detail, the capacitor 115 starts to charge over the circuit extending from battery B8, through resistor 114 and capacitors 116, 115 to ground. The capacitor 116 bypasses the resistor 113 during the time required for the capacitor 115 to charge to prevent the resistor 113 from materially changing the time constant. An advantage resulting from this use of bypass capacitor 116 is that the capacitor 115 may be made larger. Thus, the input impedance to be base of transistor 110 is lower.

The capacitor 115 charges exponentially toward the —24 volt potential of battery B8. In approximately 20 microseconds, the base of transistor 110 reaches —12 volts at which potential the base is clamped to the —12 volts on the collector. While the voltage applied to the base of transistor 110 rises, the voltage applied to the emitters of transistors 65, 66 also rises. The result is that PNP transistor 110 draws current through capacitors 81, 80 and NPN transistor 66 is biased "on."

As the voltage on the base of transistor 110 rises, a replica thereof passes through transistor 66 and diode 67 in parallel with winding W3, to the network 22. Responsive thereto, a path fires through the network to the register or link. A description of the response in the register or link is reserved until after completion of the description of the line circuit. The important response to note here is that, after a path is completed, a positive potential is returned through the network 22 and winding W3, to the emitter of transistor 65 (which switches "on").

While the path is being fired through network 22, capacitor 81 discharges to provide extra power required to fire the diodes. Also, the transistor 110 provides a portion of the firing potential and the current required to hold the path while the firing pulse is present. After the firing pulse terminates, the transistor 65 saturates if a path is completed to a register or a link to energize the path from ground G1.

Before transistor 65 turned "on," the base of transistor 131 was made negative, with respect to its emitter. The negative potential was taken from the voltage divider 132, 133. After the transistor 65 turns "on" and saturates, its base ground potential makes the base of transistor 131 positive with respect to its emitter. Thereupon, transistor 131 switches "on," saturates, and changes its collector potential from the positive potential of battery B9 to the negative potential of battery B10. This change to negative potential is applied through the resistor 134 to the base of transistor 92 which switches "on".

*Ringing.*—Means are provided for inhibiting the transmission of ring signals in calling line circuits and for transmitting ring signals in called line circuits. More particularly, when transistor 92 switches "on" in a line circuit having operated hookswitch contacts, the +75 volts of battery B1 are applied through winding W2, contacts 90*a* and transistor 92. This back biases diode 93 and prevents transmission of a ring signal. When transistor 92 switches "on" in a line circuit having unoperated hookswitch contacts, the +75 volt potential is absent. Diode 93 is not back biased. A ring signal does pass through resistor 94, diode 93, transistor 92 and the sounder 91 to ground.

*Lockout.*—Means are provided for placing the line circuit in lockout after the switch path is completed through the network 22. In greater detail, before the transistor 131 is switched "on," the diode 135 blocked the +24 volt potential of battery B9. However, after the transistor 131 switches "on," the diode 135 passes the −12 volts of battery B10. This negative potential is applied through resistor 138 to the base of transistor 105 which switches "on" to apply its emitter ground to the potential point P4. This discharges the capacitor 115 and prevents the generation of any further firing pulses, unless a +24 volt seize pulse is received. The −12 volts of battery B10 are also applied through resistor 140 of voltage divider 140, 141 to the base of transistor 142, which turns "on." The emitter of transistor 142 is supplied with ground potential from the transistor 99 when the associated hookswitch contacts 90*a* are operated. When the transistor 142 turns "on," current flows through resistors 143, 132 to ground, thus holding the transistor 131 "on." Release is controlled by hookswitch contacts 90*a* which may open to switch "off" transistor 99 thereby depriving transistor 142 of its emitter ground. Then transistor 142 switches "off" to allow the transistor 131 to switch "off." Thus, the hookswitch contacts must be closed, then reopened to complete a new path through the network 22. This hookswitch control is the condition described as "lockout."

*Called line.*—The manner in which a called line is served will be described next. Any suitable register equipment marks all inputs to NOR gate 39 of a called line by removing negative potentials normally applied thereto. In FIG. 1, this marking path is shown at 145. Simultaneously, the register applies the +12 volt potential to a common seize bus and point P3 as explained in connection with FIG. 7.

*Busy test.*—In a busy condition the potential on the base of the transistor 105 is taken from the voltage divider, traced from battery B10 through transistor 131, diode 135, resistors 138, 102, and transistor 99 to ground. The +12 volts on the seize bus will over-ride the base potential to turn "off" transistor 105 during idle conditions, but not during busy conditions. Hence, the transistor 105 in a busy line circuit does not respond to a +12 volt pulse on the seize bus (point P3). No firing pulse is generated and a path does not fire through network 22 to a link.

*Busy over-ride.*—As will become apparent from a study of the co-pending Arseneau-Bereznak-Osborn application, the calling line must fire a second path through the network in order to complete a connection to a called line. This second path is fired at a time when the calling line is in lockout. Obviously, therefore, the calling line appears busy and the +12 volt potential at point P3 does not generate a firing pulse. To overcome this busy appearance, the point P3 is marked with +24 volts—not +12 volts. The circuit values are such that the transistor 105 turns "off" to generate a firing pulse in the above described manner. Hence, the calling line busy appearance is over-ridden.

*Pre-empt.*—To pre-empt a call, a −24 volt pulse is applied to point P5 at a time when the NOR gate 39 is marked from a register 23 via path 145 (FIG. 1). When the NOR gate is marked, transistor 123 is turned "off." The ground applied through diode 150 is removed from the junction between resistors 151, 152. Then, the −24 volt pre-empt potential at point P5 is effectively applied through resistors 151, 152, diode 153 and resistor-capacitor 154, 155, to the base of transistor 66. This switches "off" transistor 66 and terminated holding current to the network 22. The path through the network from the pre-empted line is released.

*Link circuit*

The operation of the link circuit (FIG. 9) will be described next. First, consider the manner in which a calling line is extended to the link.

*Finder operation.*—The time base generator 25 cyclically enables the link to complete a connection to a calling line. To do this, the generator removes a positive potential from each input 46*a*, a positive charge on the upper plate of capacitor 160 decays, and then is replaced by a negative potential applied through resistor 161. Responsive thereto, transistor 162 turns "off" slowly. The slow turn "off" is not important at this time. Thus, the potential at point P20 rises from ground to the +12 volts of battery B20 (less any IR drop through the load resistor 163).

As the potential at point P20 goes positive, the base electrode of the transistor 165 changes from a negative voltage applied through the resistor 166 to a positive value. Thus, the transistor 165 switches "on." Hence, the potential at point P21 changes from the +12 volts of battery B21 to the emitter ground of transistor 165.

The voltage divider 166 makes the base of the transistor 85 positive with respect to the emitter when point P21 goes to ground. The transistor 85 switches "on," but does not saturate and, therefore, appears as a constant current source. The base of the transistor 74 is now negative relative to the +24 volts of the battery B2. Hence, it switches "on."

As the transistor 74 switches "on," the +24 volts (less any IR drop) of battery B2 are applied to the network 22. The capacitor 79 slows the rise time of the wave form of the voltage applied to network 22 as indicated by wave form II of FIG. 3. Those familiar with PNPN diodes will readily understand why a slow rising voltage of the type described, is desirable to avoid firing any diodes in the network 22 on a rate effect.

At this point in the description, no path has fired through the network. Thus, there is no appreciable load drawing current through the transistor 74. The resistor 78 does provide a slight amount of loading, but not enough to saturate the transistor 74. The link of FIG. 9 is allotted to find a calling line. Thereafter, the time base generator 25 de-energizes the ENABLE input to NOR gate 39 (FIG. 8). It is assumed that the remaining NOR gate inputs were de-energized previously. The result is that a path fires through the network, in the above described manner, during the period shown by curve III of FIG. 3.

In the link circuit, the instant that a path is completed through the network, current flows from the transistor 85, through capacitor 79, the network 22, diode 67 and capacitor 81 to ground. This instantaneously applied current holds the switch path. As soon as current flows over this circuit, the transistor 85 saturates. However, before the current flow through the transistor 85 can change appreciably, current flows from battery B2 transistor 74. As this current flow increases through the transistor 74, its impedance changes to a high impedance for D.C. source current. The advantage is that the A.C. currents are kept out of the D.C. source B2. Instead, the capacitor 61 will provide a low impedance to the A.C. voice frequency currents.

With the increase of current through the transistor 74, point P22 goes negative relative to the +12 volts on the emitter of transistor 170. Hence, the transistor 170 turns "on" and applies a +12 volt potential from battery B24 through the resistors 171, 172 to the base of transistor 165. This holds "on" that transistor, and therefore, holds "on" the switch path through the network 22.

*Connector operation.*—The "finder" function is now completed and nothing further happens until the time base generator 25 removes all potentials from inputs 46*b*. No problems result if there is any time period between the re-energization of inputs 46*a* and the de-energization of inputs 46*b* because a charge stored on capacitor 160 delays the turn "on" of transistor 162.

Before the transistor 175 switched "off," after gate 46*b* was de-energized, the point P23 was at ground potential. Thus, the transistor 176 base bias was taken from a voltage divider connected between −12 volt battery B23, and ground at point P23. If now the transistor 175 is "off" and the transistor 170 is "on," the base bias for the transistor 176 goes positive relative to the emitter and transistor 176 switches "on." This positive bias is taken from a voltage divider traced from a −12 volts battery B23 through point P23, resistor 171 and the collector-emitter of transistor 170 to a +12 volt battery. The result is that transistors 176, 177 switch "on" in the manner of transistors 165 and 85 as described above.

When the transistor 178 switches "on" (as transistor 74 switched "on") a slow rising connector allot potential is applied to the link side point Y2 of the network. Thereafter, common equipment de-energizes the ENABLE input of a NOR gate (such as 39) in a called line circuit. Then a path fires from the called line identified by a NOR gate similar to gate 39, through the network to the allotted link.

Upon completion of such a path through the network, current flows through the resistor 179, this causing an IR drop which makes the point P25 become less positive. This changes the potential across capacitor 180 which charges. While the capacitor charges, there is a delay which allows enough time for the called line firing frame to disappear. Then, the base of the transistor 181 reaches the negative potential of the point P25. Thereupon, current flows from the +12 volt battery B24 through the transistor 170, an isolation diode 182, the transistor 181, resistors 183, and 166 to a −12 volt battery.

Means are provided for interconnecting the calling and called lines only if a connection is completed from both lines through the networks to the link. In greater detail, the current from the +12 volt battery B24 flows through the transistor 170, 181 as the result of an AND function which occurs only after paths are completed from both the calling and called lines to the link. When the current from the +12 volt battery B24 flows through resistor 190, the base of the transistor 191 goes positive and the transistor switches "on." This applies a negative potential through the resistor 192 to the base of transistor 60 which switches "on." In doing so, an A.C. voice frequency path is completed from point Y1 through capacitor 61, to point Y2. Conversation follows over the completed path.

Also responsive to the output of transistor 191, a voltage pulse appears at point P26 to release the register and any associated equipment.

First party release is provided. More particularly, the collector potential for transistors 74 and 178 is supplied from ground G1 through the network 22. When the associated subscriber hangs up, to open hookswitch contacts 90*a* the path through the network is broken and the transistor 74 or 178 switches "off." In doing so, the base bias is removed from either transistor 170 or 181 which switches it "off." This removes the "AND" function required to hold the transistor 191 "on." When the transistor 191 turns "off" the base drive is removed from the transistor 60. However, the capacitor 194 preserves the "on" condition briefly. After expiration of a delay period, current no longer flows through the capacitor 194 and transistor 60 turns "off." This opens the speech path. The capacitor 194 causes the transistor 60 to turn "off" slowly, thus avoiding the transmission of any abrupt voltage change to the network. This prevents mis-firing in the network.

If it becomes necessary to provide supervisory functions during a call, a ground pulse appears at point P27. This discharges the capacitor 194 and switches "off" the transistor 60. While the transistor 60 is "off" any suitable logic function is completed. Thereafter, the pulse is removed from the point P27. This way, a supervisory tone may be sent to either subscriber, for example.

While the principles of the invention have been described above in connection with specific apparatus and applications, it is to be understood that this description is made only by way of example and not as a limitation on the scope of the invention.

I claim:

1. A speech path controller comprising a line circuit, a self-seeking current controlled switching network, and a controlling link circuit, means responsive to electrical signals applied from said line and link circuits to the ends of said network for extending a connection from a first end marked point through the network to a second end marked point, means in said line circuit for providing a source of instantaneously applied current, and means responsive to current from said source for holding said connection after a path is completed through said network.

2. In a speech path controller for use in a telephone system having a plurality of subscriber lines, each being terminated by an individual line circuit, the combination comprising a self-seeking current controlled switching network for selectively interconnecting said lines and controlling link circuit, means in each of said line circuits for providing a busy line test responsive to a call to a called line to indicate whether the associated line is busy or idle, means responsive to an idle line indication for applying an end marking potential to said network to control the extending of a connection through said system to said called line, means in said link circuits for applying a marking to the other end of said network for extending a connection from a first of the end markings through the network to a second of the end markings, means in said line circuit responsive to the extension of said connection through the network for providing a source of instantaneously applied current, and means responsive to current from said source for holding said connection.

3. The speech path controller of claim 2 and means in said line circuit for selectively over-riding busy line indications, and means responsive to said last named means for applying the end marking potential to said network thus extending connection to or from busy lines.

4. The telephone system of claim 3 wherein said busy indicating and over-ride means comprise a two condition electronic switch means having a control electrode, voltage dividing means having a potential point thereon connected to said control electrode for normally biasing said switch means to a first of said two conditions, means for selectively applying a first control potential to a point on said voltage divider means which places said switch means in the second of said conditions, means for selectively applying either of two seize potentials to said voltage divider means at a point which also controls said switch means, one of said two seize potentials being of sufficient magnitude to place said switch means in said first condition regardless of whether or not said first control potential is present and the other of said two seize potentials being of smaller magnitude to place said switch means in said first condition only when said control potential is absent, and means controlled by said switch means when in said first condition for extending connections through said system.

5. A telephone speech path controller comprising a line circuit, a self-seeking current controlled switching network and a network controlling link circuit, means responsive to direct current electrical signals applied from said line and link circuits to the ends of said network for extending connections from the first of the end marked points through the network to a second of the end marked points, means in said line circuit for providing a source of instantaneously applied direct current for holding said connection after a path is completed through said network, and means for super-imposing voice frequency currents on said direct currents.

6. A telephone system comprising a line circuit, a self-seeking switching network and a controlling link circuit, means in said link for applying a marking potential having a slow rising wave form to one side of said network, means in said line circuit for thereafter applying a second marking potential having slow rising wave form to another side of said network, means responsive to said second marking potential for extending a path through said network in a random manner, and means comprising a source of instantaneously applied direct current in said line circuit for holding the first randomly selected path extended through said network.

7. The telephone system of claim 6 and means for superimposing voice frequency currents on said direct currents.

8. The telephone system of claim 6 and means for initially applying said direct current to said network at a relatively high current level, and means for thereafter reducing said current to a relatively low level.

9. The telephone system of claim 6 and a plurality of subscriber lines each terminating at one end in an associated one of said line circuits, each of said subscriber lines having a signalling means terminating the other end, a talking battery, hookswitch means associated with each of said subscriber lines for either associating said signaling means with said line or completing a loop to said talking battery, a source of signaling current for operating said signaling means, means in said line circuit comprising an electronic switch and a diode for interconnecting said source of signaling current and said line, whereby said signaling current flows through said diode to said line when said switch is "on," and means responsive to operation of said hookswitch for removing said signaling means from said line and completing said talking battery loop over said line, the potential of said talking battery having a magnitude and polarity which back biases said diode to block the flow of said signal current to said line after said operation of said hookswitch.

10. The telephone system of claim 9 and means in said circuit for providing a busy line indication when the aessociated line is busy, and means responsive to an idle line indication at a called line for extending a connection through said system to said called line.

11. The telephone system of claim 10 and means in said line circuit for selectively over-riding said busy line indications at a called line, and means responsive to said last named means for extending connections to busy lines.

12. The telephone system of claim 11 wherein said busy indicating and over-ride means comprise a two condition electronic switch means having a control electrode, voltage dividing means having a potential point thereon connected to said control electrode for normally biasing said switch means to a first of said two conditions, means for selectively applying a first control potential to said voltage divider means to alter the voltage at said potential point for placing said switch means in the second of said conditions, means for selectively applying either of two seize potentials to said voltage divider to alter the voltage at said potential point, one of said two seize potentials being of sufficient magnitude to place said switch means in said first condition regardless of whether or not said first control potential is present and the other of said two seize potentials being of smaller magnitude to place said switch means in said first condition only when said control potential is absent, and means controlled by said switch means when in said first condition for extending connections through said system.

13. A telephone system comprising a subscriber line having subscriber signaling device and a talking battery associated therewith, hookswitch controlled means associated with said subscriber line for either associating said signaling means with said line or completing a loop to said talking battery over said line, a source of signaling current for operating said signaling device, means comprising an electronic switch and a diode for interconnecting said source of signaling current and said line, and means responsive to operation of said hookswitch means for removing said signaling device and effectively applying the potential of said talking battery over said line, said potential having a magnitude and polarity which back biases said diode to block the flow of said signal current to said line.

14. A telephone system comprising a plurality of subscriber lines terminated at one end in a line circuit and at the other end by a signaling device, line transformer means connected to each of said lines in said line circuit, a self-seeking network of switching points and a controlling link circuit, means in said link circuit for applying a marking potential having a slow rising wave form to one side of said network, means in said line circuit for thereafter applying a second marking potential having a slow rising wave form to another side of said network, means responsive to said second marking potential for extending a self-seeking path through randomly selected switching points in said network, means comprising a source of instantaneously applied current in said line circuit for holding said path after completion thereof, a talking battery connected to said transformer, hookswitch controlled means associated with each of said subscriber lines for either associating said signaling device with said line or completing a path from said talking battery over said line, a source of signaling current for operating said signaling device, means comprising an electronic switch and a diode for interconnecting said source of signaling current and said line, and means responsive to operation of said hookswitch for removing said signaling device from said association with said line and completing said path for applying said talking battery to said line, the potential of said talking battery having a magnitude and polarity which back biases said diode to block the flow of said signal current to said line.

15. A telephone system of claim 14 and means in each of said line circuits for indicating whether the associated line is busy or idle, and means responsive to an idle line indication at a called line for applying said slow rising wave form in the line circuit of said called line thereby extending a connection through said system.

16. The telephone system of claim 15 and means in said called line circuit for selectively over-riding busy line indications, and means responsive to said last named means for applying said slow rising wave form in said busy line circuits thereby extending connections to busy called lines.

17. The telephone system of claim 16 wherein said busy indicating and over-ride means comprise a two condition electronic switch means having a control electrode, voltage dividing means having a potential point thereon connected to said control electrode for normally biasing said switch means to a first of said two conditions, means for selectively applying a first control potential to said voltage divider for altering the voltage at said potential point to place said switch means in the second of said conditions, means for selectively applying either of two seize potentials to said voltage divider also for altering the voltage at said potential point, one of said two seize potentials being of sufficient magnitude to place said switch means in said first condition regardless of whether or not said first control potential is present and the other of said two seize potentials being of smaller magnitude to place said switch means in said first condition only when said control potential is absent, and means controlled by said switch means when in said first condition for extending connections through said system.

18. A telephone system comprising a plurality of subscriber lines, a self-seeking switching network and a controlling link circuit, means in said link circuit for applying a first marking potential having a slow rising wave form to one side of said network, resistance means having characteristics such that its resistance changes as a function of current flow through it, the current begins at a relatively high level and thereafter falls off responsive to the flow of said current until said current stabilizes at a relatively low level, means comprising said nonlinear resistance connected in series with said means for applying said first marking for causing an initial surge of current which drops to a low level current after said initial surge, means in said line circuit for applying a second marking potential having a slow rising wave form to another side of said network, means responsive to said second marking potential for extending a path through said network, and means comprising a source of instantaneously applied current in said line circuit for holding said path after its completion through said network.

19. The telephone system of claim 18 wherein said non-linear resistance comprises a lamp having a predetermined thermal inertia.

20. The telephone system on claim 19 and means in each of said line circuits for providing a busy line indication, and means responsive to an idle line indication in the line circuit of a called line for applying said second marking, thus extending a connection through said system.

21. The telephone system of claim 20 and means in said line circuit of a called line for selectively over-riding busy line indications, and means responsive to said last named means for applying said second marking, thus extending connections to busy called lines.

22. The telephone system of claim 20 wherein said busy indicating and over-ride means comprises a two condition electronic switch means having a control electrode, voltage dividing means having a potential point thereon connected to said control electrode for normally biasing said switch means to a first of said two conditions, means for selectively applying a first control potential to said voltage divider means for altering the voltage at said potential point to place said switch means in the second of said conditions, means for selectively applying either of two seize potentials to said voltage divider means also for altering the voltage at said potential point, one of said two seize potentials being of sufficient magnitude to place said switch means in said first condition regardless of whether or not said first control potential is present and the other of said two seize potentials being of smaller magnitude to place said switch means in said first condition only when said control potential is absent, and means controlled by said switch means when in said first condition for extending connections through said system.

23. A telephone system comprising a plurality of subscriber lines, each line being terminated by an individually associated line circuit, a self-seeking, current controlled, network comprising a plurality of cascaded PNPN diode matrices, a link circuit, means responsive to electrical signals applied from said line and said link circuit to the ends of said network for extending connections from an end marked point through the network to an end marked point, means for increasing the current flow through said PNPN diode while said connections are being extended through said network and reducing the current flow through said diodes after said connection is completed, each of said subscriber lines having a signalling means and a talking battery associated therewith, hookswitch contact means associated with each of said subscriber lines for either associating said signalling means with said line or completing a path from said talking battery over said line, a source of signaling current for operating said signaling means, means comprising an electronic switch and a diode for interconnecting said source of signaling current and said line, and means responsive to operation of said hookswitch for removing said signaling means and applying the potential of said talking battery over said path, said potential having a magnitude and polarity which back biases said diode to block the flow of said signal current to said line.

24. A telephone system comprising a line circuit, a self-seeking switching network and a link circuit, means in said link for applying a first marking potential to one side of said network, means in said line circuit for thereafter applying a second marking potential to another side of said network, means responsive to said second marking potential for extending a path through said network, said second marking means comprising an electronic switch means having a control electrode, voltage dividing means having a potential point thereon connected to said control electrode, the potential at said point normally biasing said switch means "off," means for selectively applying a first control potential to said voltage divider means on one side of said potential point to switch "on" said switch means, means for selectively applying either of two potentials to said voltage divider means on the other side of said potential point, one of said two potentials being a sufficient magnitude to control said switch means regardless of whether or not said first control potential is present and the other of said two potentials being of smaller magnitude to control said switch means only when said control potential is absent, and means controlled by said switch means for causing said second marking to be applied to said network thus extending said connections through said system.

25. A switching system comprising a plurality of line circuits, means in each of said line circuits for providing a busy line indication, comprising an electronic switch means having a control electrode, voltage dividing means having a potential point thereon connected to said control electrode, the potential at said point normally biasing said switch means to a first condition, means for selectively applying a first control potential to said voltage divider means for altering the voltage at said potential point to switch said switch means to a second condition when the associated line is busy, means for extending a seizure signal to a line by selectively applying either of two potentials to said voltage divider also for altering the voltage at said voltage point, one of said two potentials being of sufficient magnitude to place said switch means in said first condition regardless of whether or not said first control potential is present and the other of said two potentials being of smaller magnitude to place said switch means in said first condition only when said control potential is absent, and means controlled by said switch means when in said first condition for extending connections through said system.

26. A speech path controller comprising a line circuit; a self-seeking, current controlled network; and a link circuit; means in said line circuit and said link circuit for applying end marking potentials to the periphery of said network, whereby switch paths extend and collapse from one of said end marked points through said network in search of the other of said end marked points; control means for energizing said paths at a relatively high current level during the time period required to complete a connection and at a relatively low level after said path is completed, and means for supplying holding current to said path for the duration of a call.

27. The speech path controller of claim 26 wherein said control means comprises a lamp and said network comprises a plurality of cascaded PNPN diode matrices, whereby a relatively large current flows through said PNPN diodes during said time period required to complete said call and thereafter falls to a relatively small current.

28. The speech path controller of claim 26 and a source of instantaneously applied current, and means for energizing said path from said source when said path is completed through said network.

29. A speech path controller for a PNPN diode switching network comprising means for applying end marking potentials to said network to complete self-seeking paths through said network, means for applying said marking potentials at levels which increases the current in said PNPN diodes while said self-seeking paths are being completed and means for reducing power dissipation after one of said paths is completed.

30. A speech path controller for a self-seeking, current controlled network of cascaded PNPN diode matrices, said diodes having a given charge carrier storage time under normal operating conditions, and means responsive to the extension of self-seeking switchpaths through said network for momentarily increasing said given storage time.

References Cited by the Examiner

UNITED STATES PATENTS

| | | | |
|---|---|---|---|
| 2,855,524 | 10/1958 | Shockley. | |
| 2,946,855 | 7/1960 | Hussey | 179—18 |
| 2,972,683 | 2/1961 | Lunney | 179—18 X |
| 3,027,427 | 3/1962 | Woodin | 179—18 |

ROBERT H. ROSE, *Primary Examiner.*

WILLIAM C. COOPER, *Examiner.*